United States Patent
Sugimoto (10) Patent No.: US 7,564,205 B2
(45) Date of Patent: Jul. 21, 2009

(54) ELECTRONIC DEVICE AND IMAGE FORMING APPARATUS

(75) Inventor: Tasuku Sugimoto, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 581 days.

(21) Appl. No.: 11/493,818

(22) Filed: Jul. 27, 2006

(65) Prior Publication Data
US 2007/0024222 A1 Feb. 1, 2007

(30) Foreign Application Priority Data
Jul. 27, 2005 (JP) ............... 2005-217636

(51) Int. Cl.
H02P 23/14 (2006.01)
B41J 27/00 (2006.01)
(52) U.S. Cl. .............. 318/400.01; 318/400.07; 347/235; 347/247; 347/261
(58) Field of Classification Search ............ 318/400.01, 318/400.07, 400.14, 400.38; 347/231, 235, 347/243, 247, 250, 259–261
See application file for complete search history.

(56) References Cited

U.S. PATENT DOCUMENTS

| | | | | |
|---|---|---|---|---|
| 5,883,659 A * | 3/1999 | Serizawa et al. | ............ | 347/260 |
| 7,248,276 B2 * | 7/2007 | Suzuki | ............ | 347/237 |
| 7,365,765 B2 * | 4/2008 | Dan | ............ | 347/261 |
| 7,400,105 B2 * | 7/2008 | Sugimoto et al. | ...... | 318/400.14 |
| 7,417,661 B2 * | 8/2008 | Sugimoto | ............ | 347/261 |
| 2009/0058348 A1 * | 3/2009 | Ryu | ............ | 318/639 |

FOREIGN PATENT DOCUMENTS

| | | |
|---|---|---|
| JP | 5-085143 | 4/1993 |
| JP | 6-318350 | 11/1994 |
| JP | 7-312891 | 11/1995 |
| JP | 10-064184 | 3/1998 |
| JP | 11-235069 | 8/1999 |
| JP | 2001-014789 | 1/2001 |
| JP | 2001-061297 | 3/2001 |
| JP | 2004-145916 | 5/2004 |

* cited by examiner

Primary Examiner—Walter Benson
Assistant Examiner—Eduardo Colon-Santana
(74) Attorney, Agent, or Firm—Banner & Witcoff, LTD.

(57) ABSTRACT

An electronic device includes a motor, a detector, and a controller. The detector detects a rotational speed of the motor. The controller selects a gain from a plurality of gains based on the rotational speed and controls rotation of the motor through feedback control. The controller uses a first gain from startup of the motor until the motor initially reaches a predetermined rotational speed after the startup. The controller switches to a second gain smaller than the first gain when the motor initially reaches the predetermined rotational speed after the startup, and uses the second gain in a predetermined range with respect to the rotational speed. The predetermined range is defined between a lower limit smaller than the predetermined rotational speed and a higher limit larger than the predetermined rotational speed.

9 Claims, 7 Drawing Sheets

ELECTRONIC DEVICE AND IMAGE FORMING APPARATUS

CROSS REFERENCE TO RELATED APPLICATIONS

This application claims priority from Japanese Patent Application No. 2005-217636 filed Jul. 27, 2005. The entire content of the priority application is incorporated herein by reference.

TECHNICAL FIELD

The disclosure relates to an electronic device and an image forming apparatus.

BACKGROUND

Motor controlling devices well known in the art, such as that disclosed in Japanese Patent Application Publication No. 2001-61297, include detecting means for detecting the rotational speed of the motor; controlling means; and a motor driver for driving the motor based on commands from the controlling means.

This type of controlling device employs an FG (frequency generator) sensor as the detecting means for detecting the rotational speed of the motor and outputting an FG signal, and an ASIC as the controlling means for outputting an acceleration and deceleration signal based on the FG signal outputted from the FG sensor to the motor driver. By controlling the supply current provided by the motor driver to the motor, this construction can control the speed of the motor through feedback control.

However, the motor requires a large torque on startup and takes a predetermined time to achieve a target rotational speed. One conceivable method of minimizing this predetermined time is to perform feedback control at startup (when the rotational speed deviates most from the desired speed) using a large gain and to switch to a smaller gain when the rising rotational speed of the motor has a smaller deviation from the target value in order to quickly stabilize the motor rotation.

SUMMARY

Switching the gain to a smaller value when the deviation in rotational speed decreases, as described above, involves reducing the control amount when the rotational speed of the motor approaches the target speed. However, reducing the control amount in turn increases the time required to reach the target speed. On this point, there is room for improvement.

In view of the foregoing, it is an object of one aspect of the invention to provide an electronic device and image forming apparatus capable of quickly stabilizing the rotational speed of a motor while shortening the time required for reaching the target speed.

In order to attain the above and other objects, one aspect of the invention provides an electronic device. The electronic device includes a motor, a detector, and a controller. The detector detects a rotational speed of the motor. The controller selects a gain from a plurality of gains based on the rotational speed and controls rotation of the motor through feedback control. The controller uses a first gain from startup of the motor until the motor initially reaches a predetermined rotational speed after the startup. The controller switches to a second gain smaller than the first gain when the motor initially reaches the predetermined rotational speed after the startup, and uses the second gain in a predetermined range with respect to the rotational speed. The predetermined range is defined between a lower limit smaller than the predetermined rotational speed and a higher limit larger than the predetermined rotational speed.

According to another aspect, the invention also provides an image forming apparatus. The image forming apparatus includes a photosensitive member, a polygon motor, a polygon mirror, a detector, and a controller. The polygon mirror is configured to be rotatably driven by the polygon motor for scanning a laser beam over the photosensitive member. The detector detects a rotational speed of the polygon motor. The controller selects a gain from a plurality of gains based on the rotational speed and controls rotation of the polygon motor through feedback control. The controller uses a first gain from startup of the polygon motor until the polygon motor initially reaches a first rotational speed after the startup. The controller switches to a second gain smaller than the first gain when the polygon motor initially reaches the first rotational speed after the startup, and uses the second gain in a predetermined range with respect to the rotational speed. The predetermined range is defined between a lower limit smaller than the first rotational speed and a higher limit larger than the first rotational speed. An image formation on the photosensitive member with the laser beam is started after the polygon motor initially reaches the first rotational speed after the startup.

BRIEF DESCRIPTION OF THE DRAWINGS

Illustrative aspects in accordance with the invention will be described in detail with reference to the following figures wherein.

DETAILED DESCRIPTION

An electronic device and image forming apparatus according to some aspects of the invention will be described while referring to FIGS. 1 through 7.

In the following description, the expressions "front", "rear", "upper", and "lower" are used to define the various parts when the image forming apparatus is disposed in an orientation in which it is intended to be used.

1. Overall Structure of a Laser Printer

Figure 1:
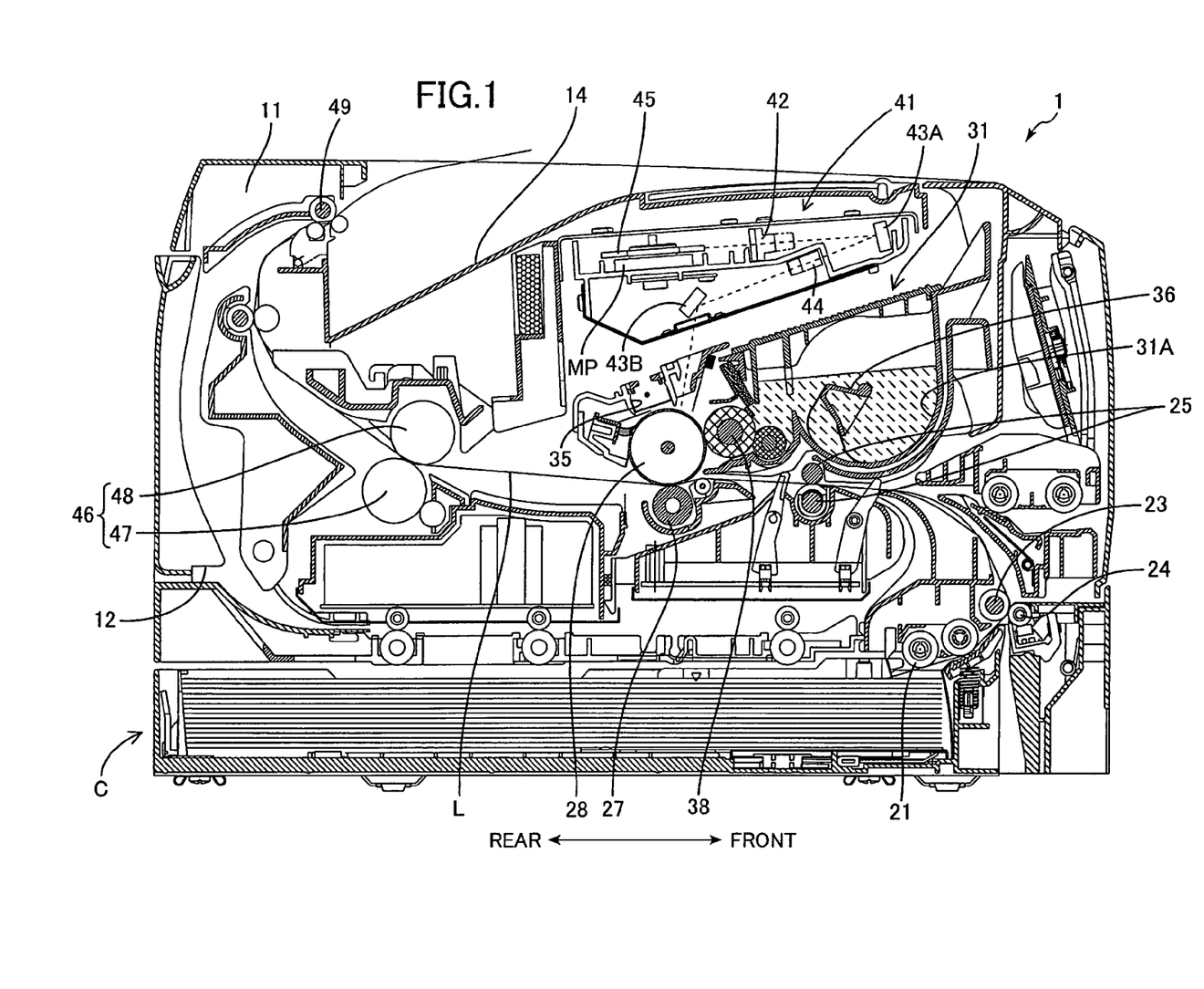
FIG. 1 is a side cross-sectional view of a laser printer according to illustrative aspects of the invention.

FIG. 1 is a side cross-sectional view of a laser printer 1 according to the illustrative aspects. The laser printer 1 includes a main casing 11, and a cassette accommodating section 12 disposed in the lower section of the main casing 11. A paper cassette C loaded with a stack of paper is mounted in the cassette accommodating section 12. In the following description, the side surface of the apparatus normally facing the user (right side in FIG. 1) will be described as the front side.

A paper-conveying path L along which the paper is conveyed is formed inside the main casing 11. As indicated by a solid line in FIG. 1, the paper-conveying path L begins from the top front of the paper cassette C and reverses directions in a near 180-degree turn toward the rear of the laser printer 1. At the rear side of the laser printer 1, the paper-conveying path L again reverses directions in a near 180-degree turn, leading to a discharge section 14 provided on the top surface of the main casing 11.

As will be described in greater detail later, toner images are formed on paper supplied from the paper cassette C as the paper is conveyed along the paper-conveying path L and are fixed with heat in a fixing unit 46 to form desired images.

2. Mechanisms for Paper Conveyance and Image Formation

The laser printer 1 is provided with a main motor (not shown) and a polygon motor Mp, both of which are brushless DC motors. As shown in FIG. 1, the laser printer 1 includes, in order along the paper-conveying path L, a feeding roller 21, a conveying roller 23, registration rollers 25, a transfer roller 27, a heating roller 48, and a discharge roller 49. Each of these rollers is driven to rotate by a drive force supplied from the main motor.

The feeding roller 21 functions to convey paper loaded in the paper cassette C to the conveying roller 23. Next, the conveying roller 23 relays the paper supplied by the feeding roller 21 to the registration rollers 25. A paper dust roller 24 is disposed in confrontation with the conveying roller 23 for removing paper dust from the paper as the paper passes between the conveying roller 23 and paper dust roller 24.

The registration rollers 25 first straighten paper received via the feeding roller 21 and conveying roller 23 to a proper orientation and subsequently convey the paper to the transfer roller 27.

As shown in FIG. 1, a photosensitive drum 28 is disposed in confrontation with the transfer roller 27. In addition, the laser printer 1 includes a Scorotron charger 35 and a scanning unit 41 disposed above the photosensitive drum 28, as well as a developing roller 38 and a toner chamber 31A arranged in order on the front of the photosensitive drum 28 (right side in FIG. 1).

The scanning unit 41 includes a laser beam source (not shown), a polygon mirror 45, an fθ lens 42, a reflecting mirror 43A, a lens 44, and a reflecting mirror 43B. The polygon mirror 45 is driven to rotate by the polygon motor Mp and reflects a laser beam emitted from the laser beam source over the surface of the photosensitive drum 28 in a high-speed scan. At this time, the photosensitive drum 28 has been given a uniform positive charge by the charger 35. More specifically, as indicated by a dotted line in FIG. 1, the laser beam is deflected by the polygon mirror 45, passes through the fθ lens 42, is reflected off the reflecting mirror 43A, passes through the lens 44, and is reflected downward by the reflecting mirror 43B and irradiated on the surface of the photosensitive drum 28.

The developing roller 38 is rotatably supported in a rear section of a casing 31 having the toner chamber 31A. An agitator 36 is provided inside the toner chamber 31A and is driven to rotated by a drive force inputted from the main motor. When driven to rotate, the agitator 36 agitates toner accommodated in the toner chamber 31A, discharging some of the toner toward the developing roller 38.

When the discharged toner borne on the developing roller 38 comes into contact with the photosensitive drum 28, the toner is supplied to (selectively borne on) regions of the photosensitive drum 28 that were exposed to the laser beam and, therefore, have a lower potential. Through this process, a toner image is formed on the photosensitive drum 28. Subsequently, when a sheet of paper passes along the photosensitive drum 28, the toner borne on the photosensitive drum 28 is deposited on the paper so that the toner image is transferred onto the paper.

The fixing unit 46 also includes a pressure roller 47 disposed in confrontation with the heating roller 48. The heating roller 48 is a cylindrical member configured of a metal tube and accommodates a halogen lamp extending in an axial direction of the heating roller 48. The halogen lamp functions to heat the surface of the heating roller 48 to a fixing temperature. The pressure roller 47 is configured of a metal roller shaft covered by a rubber material. The pressure roller 47 follows the rotation of the heating roller 48 while pressing elastically thereagainst. The pressure roller 47 and heating roller 48 constitute the fixing unit 46 and function to fix toner images on paper with heat.

The discharge roller 49 is disposed in a region bordering the discharge section 14 and the interior of the main casing 11 and function to discharge paper onto the discharge section 14 after the paper has undergone image formation and has been conveyed through the fixing unit 46.

3. Structure of a Polygon Motor Controlling Mechanism

Figure 2:
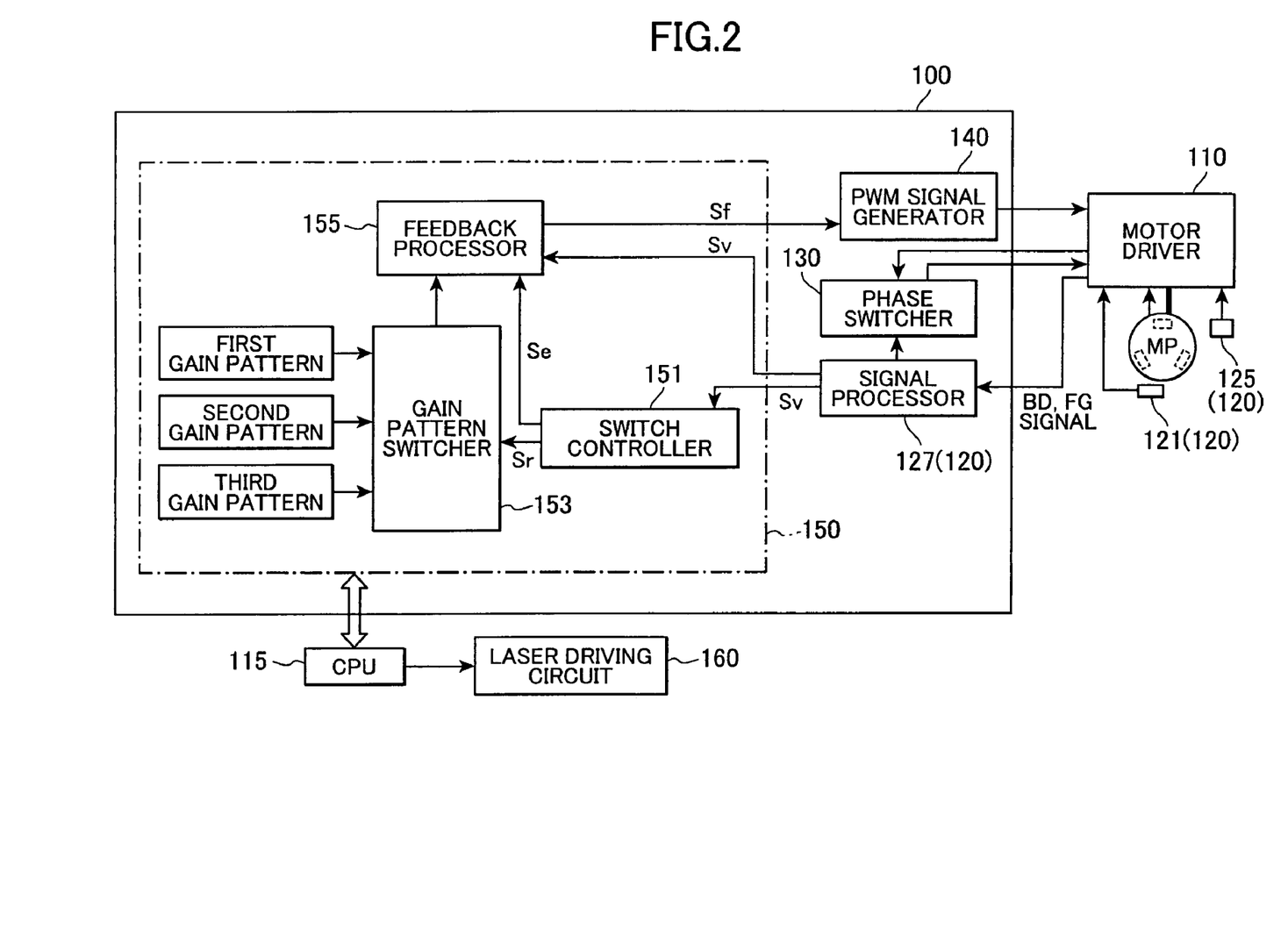
FIG. 2 is a block diagram showing an electrical configuration of a polygon motor controlling mechanism.

FIG. 2 is a block diagram showing the electrical configuration of a polygon motor controlling mechanism 100. As shown in FIG. 2, the polygon motor controlling mechanism 100 includes a motor driver 110, a speed detector 120, a feedback controller 150, and a PWM signal generator 140. The polygon motor (hereinafter abbreviated as "motor") Mp is a three-phase brushless DC motor having a permanent magnet on the rotor side and a three-phase drive coil on the stator side.

a) Speed Detector

The speed detector 120 includes an FG sensor 121 and a BD sensor 125 capable of individually detecting the rotational speed of the motor Mp; and a signal processor 127.

The FG (frequency generator) sensor 121 is a so-called electric generator sensor. The FG sensor 121 has a detecting part and generates an induced electromotive force in the detecting part as the motor rotor rotates. The FG sensor 121 outputs an AC signal (FG signal) of a frequency corresponding to the rotational speed of the rotor. That is, the frequency of the outputted signal is high for a fast rotational speed and low for a slow rotational speed.

The BD (beam detector) sensor 125 is an optical sensor having a light-receiving element capable of receiving laser light and outputting a signal based on the level of received light. More specifically, the light-receiving element of the BD sensor 125 is configured to receive reflected light from the polygon mirror 45 when the polygon mirror 45 is at a predetermined angle. Hence, the BD sensor 125 outputs a BD signal having a pulse interval corresponding to the rotational speed of the polygon mirror 45. That is, the pulse interval is short when the rotational speed of the rotor is fast and long when the rotational speed is slow.

The signals outputted from the FG sensor 121 and BD sensor 125 described above (FG signal and BD signal) are transferred to the signal processor 127 via the motor driver 110. The signal processor 127 processes the outputted signal to calculate a rotational speed (number of rotations per unit time) Vt of the motor Mp. The calculated rotational speed Vt is inputted into a switch controller 151 and a feedback processor 155 described later on a signal Sv outputted from the signal processor 127. As will be described later, the polygon motor controlling mechanism 100 detects the rotational speed of the motor Mp based on the FG signal during a predetermined period after the motor Mp starts up, and thereafter detects the rotational speed based on the BD signal. In the following description, the FG sensor 121 and BD sensor 125 will also be referred to collectively as speed sensors.

b) Feedback Controller

The feedback controller 150 includes the switch controller 151, a gain pattern switcher 153, and the feedback processor 155. Upon receiving an inputted signal Sv, the switch controller 151 reads the rotational speed Vt from data in the signal Sv. Subsequently, the switch controller 151 compares the rotational speed Vt to a threshold value (a specified rotational speed Va, a target rotational speed Vb, and the like described later) and outputs a switch command Sr or Se corresponding to the comparison results to the gain pattern switcher 153 or feedback processor 155. The polygon motor controlling mechanism 100 of the illustrative aspects is provided with three gain patterns: first, second, and third gain patterns. The gain pattern switcher 153 selects a gain pattern corresponding to the switch command Sr from these three patterns.

Similarly, the feedback processor 155 also reads the rotational speed Vt calculated by the signal processor 127 from data in the signal Sv upon receiving the signal Sv. Subsequently, the feedback processor 155 performs an arithmetic process to subtract the target rotational speed Vb from the rotational speed Vt to derive a deviation X. The feedback processor 155 performs another process to calculate a control amount Y based on the deviation X calculated above and on the gain pattern selected by the gain pattern switcher 153. The control amount Y calculated by the feedback processor 155 is then inputted into the PWM signal generator 140 as a signal Sf.

c) PWM Signal Generator and Motor Driver

The PWM signal generator 140 generates a PWM signal having a pulse width corresponding to the control amount Y. More specifically, the PWM signal generator 140 generates a PWM signal having a large duty ratio (a long ON time) when setting a large control amount Y and generates a PWM signal having a small duty ratio (a short ON time) when setting a small control amount Y, and inputs this PWM signal into the motor driver 110. In this way, the rotational speed of the motor Mp is controlled by controlling the amount of current supplied to the drive coil of the motor Mp via the motor driver 110.

As described above, the motor Mp is a brushless DC motor. Hence, in order to sustain the rotation of the rotor, it is necessary to switch the direction of the magnetic field produced by the drive coils according to the position of the rotor. To achieve this a Hall element is provided in the motor Mp, while a phase switcher 130 is provided in the polygon motor controlling mechanism 100. The Hall element outputs a positioning signal based on the position of the rotor, which signal is inputted into the phase switcher 130 via the motor driver 110. The phase switcher 130 outputs a phase switching signal to the motor driver 110 based on the positioning signal inputted from the Hall element. This construction can control both the timing at which current is supplied to each drive coil configuring the three phases and the direction of the current of each drive coil, thereby switching the direction of the magnetic field produced by the drive coils to follow the rotation of the rotor.

As shown in FIG. 2, a CPU 115 is provided for controlling the overall laser printer 1. The CPU 115 also exchanges signals between the feedback controller 150 and, hence, the polygon motor controlling mechanism 100 for monitoring the rotational status of the motor Mp.

Figure 3:
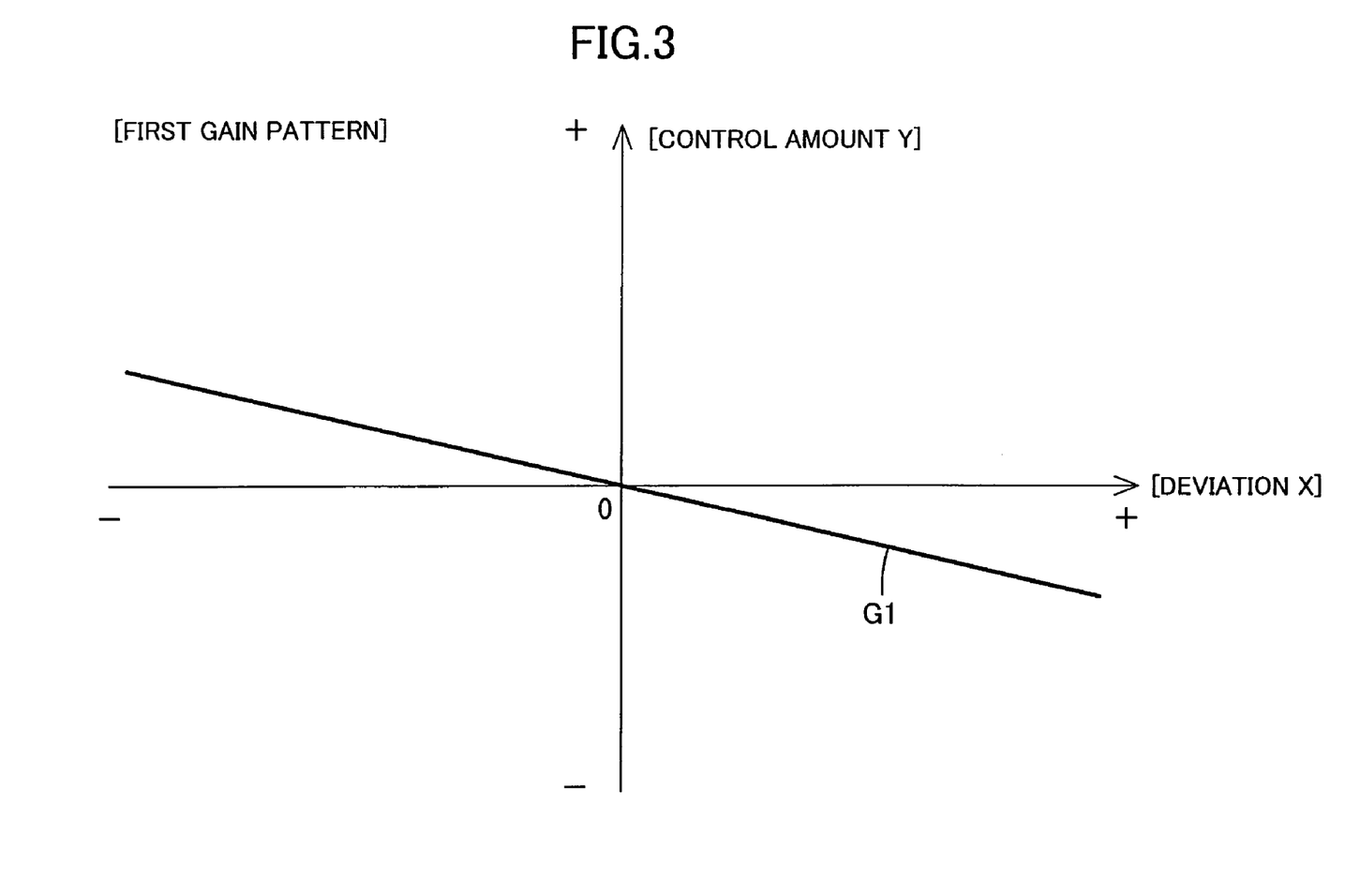
FIG. 3 is a graph showing the relationship between a deviation in rotational speed and a control amount in a first gain pattern.
Figure 4:
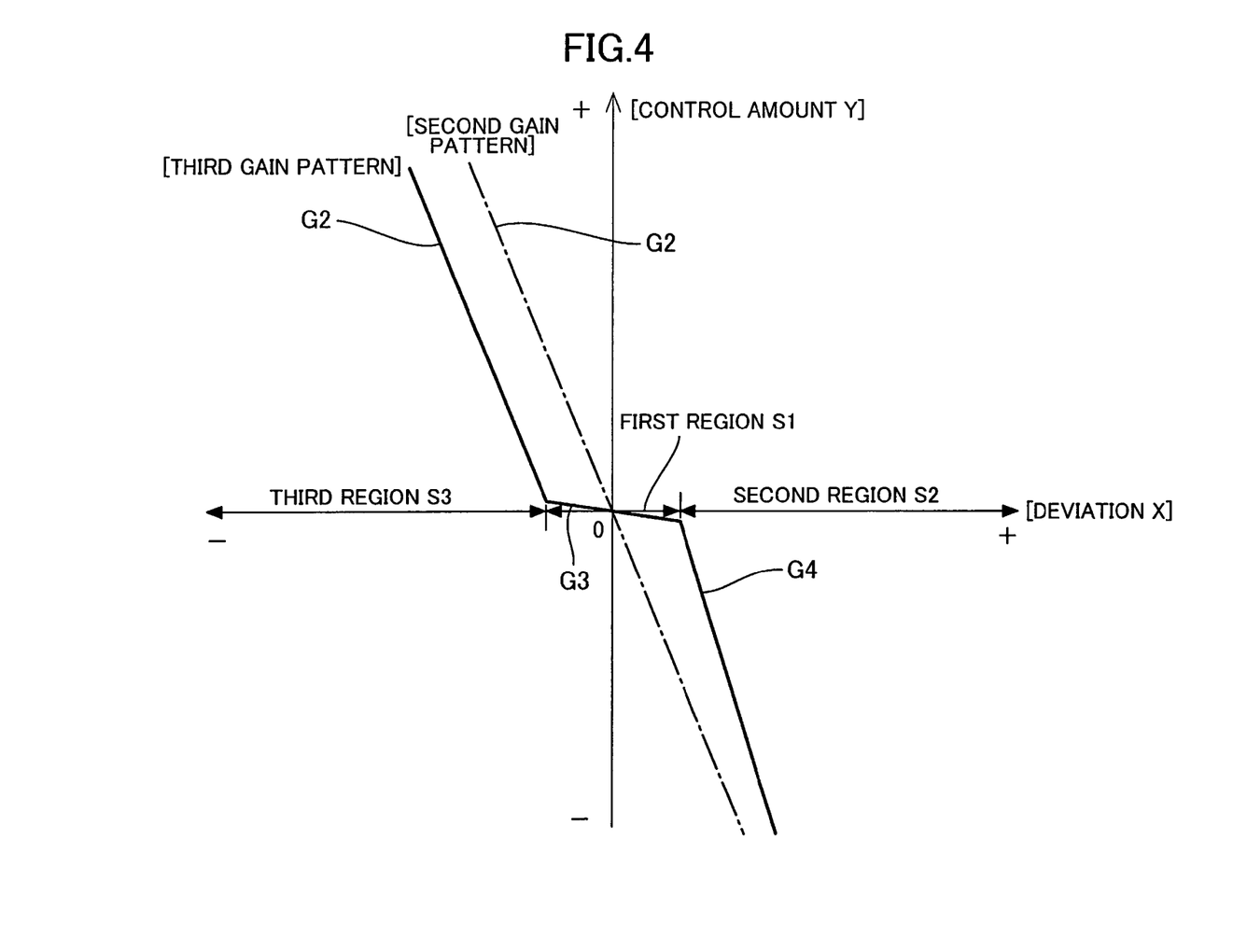
FIG. 4 is a graph showing the relationship between a deviation in rotational speed and a control amount in both a second gain pattern and a third gain pattern.
Figure 5:
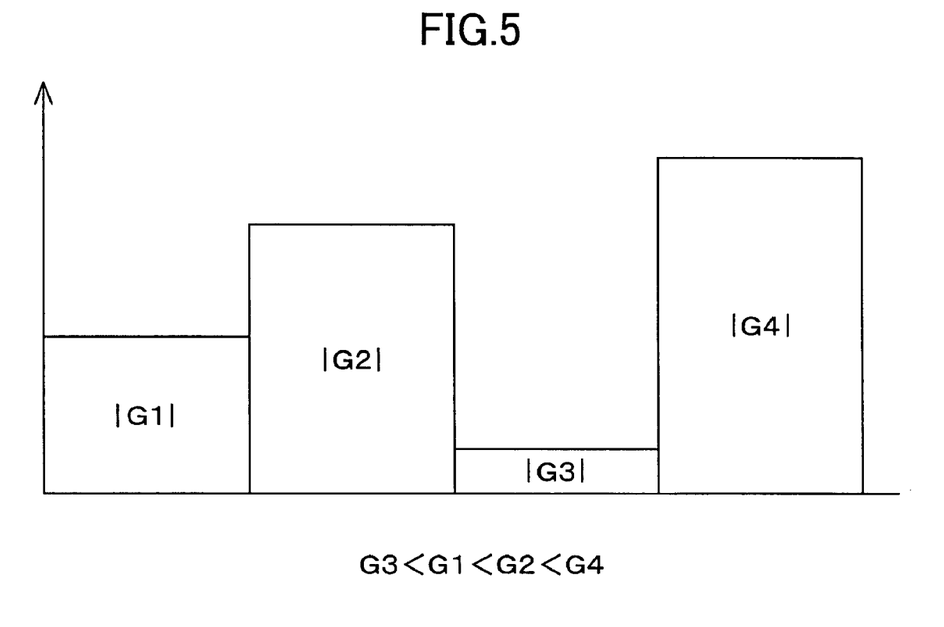
FIG. 5 is an explanatory diagram showing the size relationships among the different gains.

4. Gain Patterns and a Process for Switching Gain Patterns Through the Feedback Controller FIG. 3 is a graph showing the relationship between the deviation X in rotational speed and the control amount Y in the first gain pattern. FIG. 4 is a graph showing the relationship between the deviation X in rotational speed and the control amount Y in both the second gain pattern and the third gain pattern. FIG. 5 is an explanatory diagram showing the size relationships among the different gains.

As shown in FIG. 3, the magnitude of a gain G1 in the first gain pattern is constant, regardless the magnitude of the deviation X. The magnitude of the control amount Y is set proportional to the deviation X.

Similarly, in the second gain pattern shown in FIG. 4, the size of a gain G2 is constant, regardless the magnitude of the deviation X, and the magnitude of the control amount Y is set to a value proportional to the deviation X. As shown in FIG. 5, the gain G2 is set to a greater value than the gain G1, where a large gain value indicates a large amplification factor.

In the third gain pattern shown in FIG. 4, the gain is set in three stages based on the magnitude of the deviation X. More specifically, a first region S1, a second region S2, and a third region S3 are set based on the level of the deviation X, and a gain is set for each region.

The first region S1 is a region in which the deviation X is small and is equally (evenly) set on both sides (plus and minus sides) of the target rotational speed Vb (deviation X=0). That is, the first region S1 is defined between a lower limit Vl (FIG. 7) smaller than the target rotational speed Vb and a higher limit Vh larger than the target rotational speed Vb, such that a difference between the target rotational speed Vb and the lower limit Vl is equal to a difference between the higher limit Vh and the target rotational speed Vb. In other words, this range has the same ratio (±5% of the target rotational speed Vb in this example) on both the +X side and the −X side. A smallest gain G3 among all gains is applied to this first region S1, as shown in FIG. 5.

The second region S2 is a region in which the rotational speed goes outside of the first region S1 in the faster direction (+X direction), while the third region S3 is a region in which the rotational speed goes outside the first region S1 in the slower direction (−X direction). A gain G4 is applied to the second region S2, while the gain G2 is applied to the third region S3.

Figure 6:
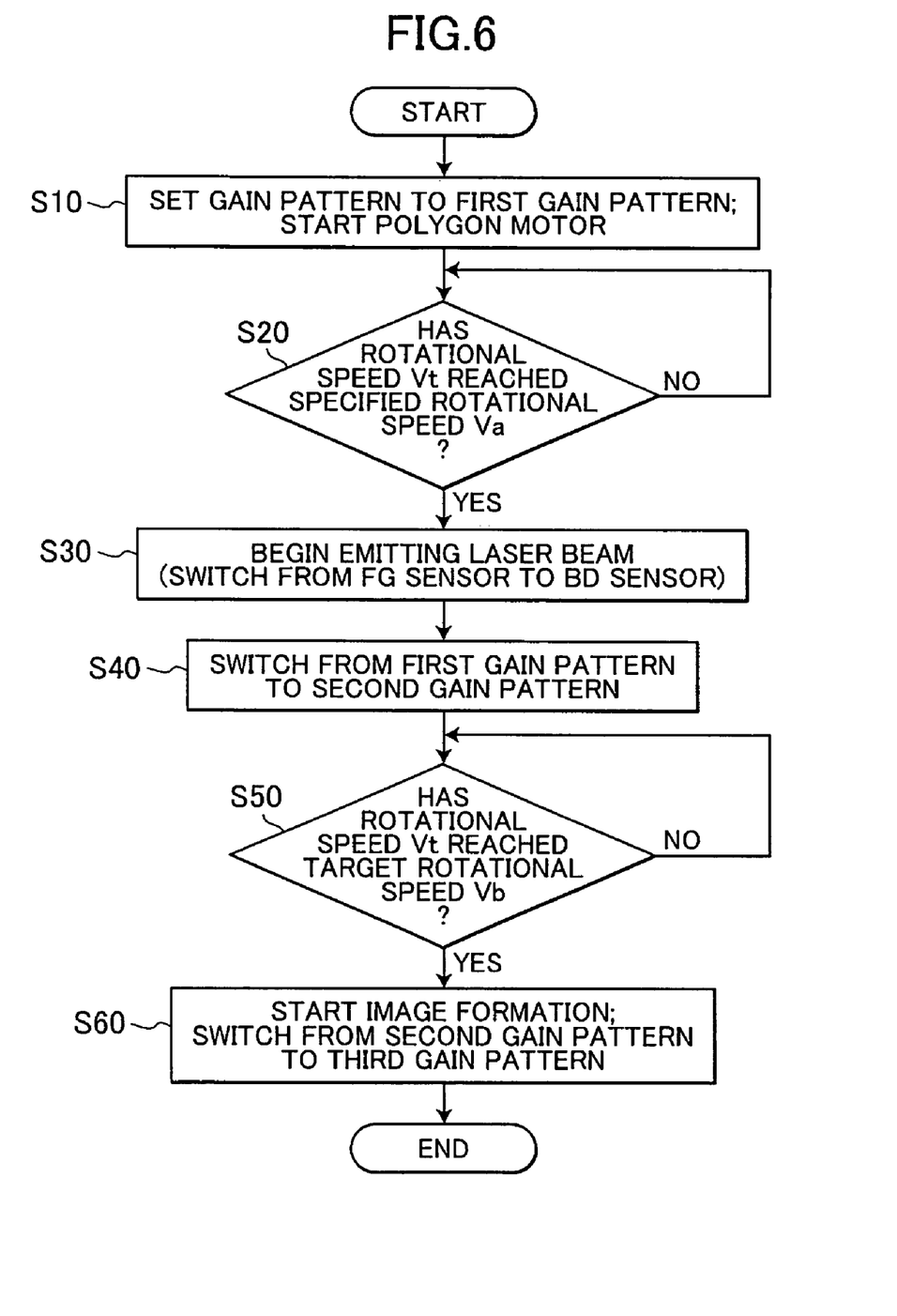
FIG. 6 is a flowchart illustrating steps in a process for switching speed sensors along with gain patterns.
Figure 7:
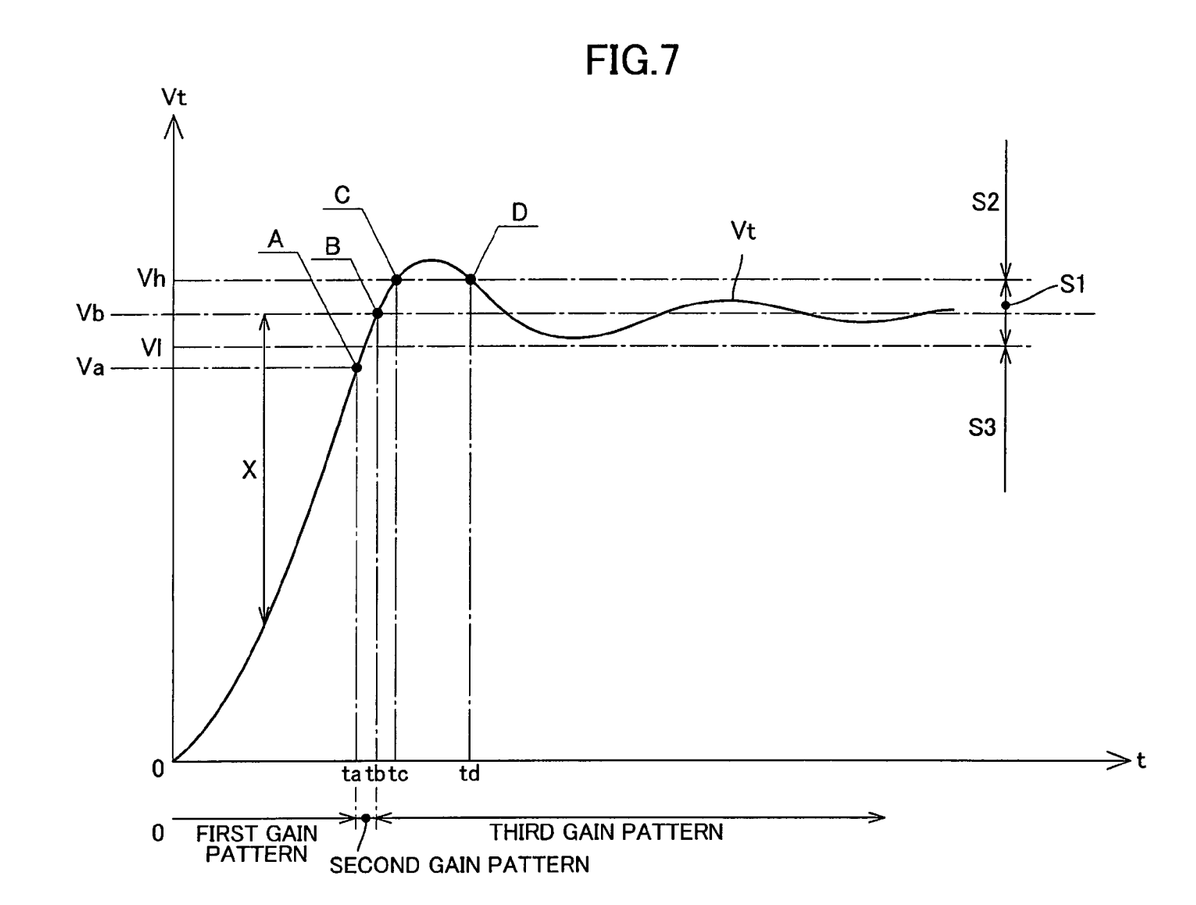
FIG. 7 is a graph showing changes over time in the rotational speed of the polygon motor.

FIG. 6 is a flowchart illustrating steps in a process for switching speed sensors along with gain patterns. FIG. 7 is a graph showing changes over time in the rotational speed Vt of the polygon motor Mp. Next, steps in a process for switching gain patterns and speed sensors from the moment the motor Mp is started until the rotational speed Vt is stabilized will be described.

The gain pattern switcher 153 is configured to select the first gain pattern as the initial setting. On startup of the motor Mp, the FG sensor 121 is used instead of the BD sensor 125 since a laser beam is not emitted at this stage.

After the motor Mp has started, in S10 of FIG. 6 the polygon motor controlling mechanism 100 begins feedback control based on an FG signal outputted from the FG sensor 121. Specifically, the signal processor 127 performs a process to calculate the rotational speed Vt of the motor Mp based on the FG signal, and outputs the rotational speed Vt to the switch controller 151 and feedback processor 155.

The feedback processor 155 calculates the deviation X based on the inputted rotational speed Vt and outputs a control amount Y based on the computed deviation X. Since the first gain pattern has been selected at this time, the feedback processor 155 sets the control amount Y proportional to the deviation X using the gain G1 as a proportionality coefficient (see FIG. 3). Next, the PWM signal generator 140 generates a PWM signal having a duty ratio corresponding to the control amount Y and supplies this signal to the motor driver 110. In this way, the amount of current supplied to the drive coils is controlled by the PWM signal.

While the feedback control process described above is performed, the switch controller 151 simultaneously performs a process to determine the rotational speed Vt of the motor Mp. Specifically, immediately after the motor Mp is started, the specified rotational speed Va is set as a threshold value used as a reference value for the determination, and in S20 the switch controller 151 determines whether the rotational speed Vt has reached the specified rotational speed Va.

The process for the rotational speed Vt in S20 is performed to determine whether the motor Mp has reached a fast rotating state substantially near the target rotational speed Vb (the rotational speed for image formation). In the illustrative aspects, the specified rotational speed Va is set to approximately 90% of the target rotational speed Vb.

While the rotational speed Vt has not reached the specified rotational speed Va (S20: NO), feedback control is continued using the same initial settings described above. However, when the rotational speed Vt reaches the specified rotational speed Va (S20: YES), then the polygon motor controlling mechanism 100 advances to S30.

In S30 the laser beam source begins irradiating a laser beam. Specifically, the CPU 115 is constantly monitoring the rotational speed Vt of the motor Mp via the feedback controller 150. When the rotational speed Vt reaches the specified rotational speed Va, the CPU 115 applies an irradiation command to a laser driving circuit 160. As a result, laser light is irradiated onto the polygon mirror 45, and the BD sensor 125 receives light reflected off the polygon mirror 45.

The BD sensor 125 outputs a BD signal that is inputted into the signal processor 127. Upon receiving the BD signal, the signal processor 127 begins calculating the rotational speed Vt of the motor Mp based on the BD signal (switching of speed sensors).

As described above, after the rotational speed Vt of the motor Mp shifts from the low rotation state to a high rotation state approaching the target rotational speed Vb, the laser beam source begins emitting laser light. This construction has the following effects.

If a laser beam were to be irradiated while the motor Mp is rotating at a low speed, the majority of the laser beam reflected by the polygon mirror 45 would be irradiated on the photosensitive drum 28. Moreover, since the rotational speed Vt of the motor Mp at this time is low, the laser beam would be irradiated for a longer time in the same regions of the photosensitive drum 28, potentially leading to the rapid deterioration of the photosensitive drum 28. However, since the laser beam is not irradiated while the motor Mp is rotating at a low speed, such rapid deterioration can be prevented.

After beginning irradiation of the laser beam, in S40 the feedback controller 150 performs a process to switch the gain pattern. Specifically, the switch controller 151 transmits the switch command Sr to the gain pattern switcher 153, and the gain pattern switcher 153 switches the gain pattern from the first to the second gain pattern upon receiving the switch command Sr.

Specifically, as shown in FIG. 7, the rotational speed Vt of the motor Mp reaches the specified rotational speed Va at a point A and a time ta. After this point, the feedback processor 155 determines the control amount Y based on the second gain pattern, that is, the gain G2 (see FIG. 4).

At the same time, after outputting the switch command Sr, the switch controller 151 changes the threshold value used as reference for determinations. Thereafter, the switch controller 151 determines in S50 whether the rotational speed Vt has reached the target rotational speed Vb.

Hence, as long as the rotational speed Vt of the motor Mp has not reached the target rotational speed Vb (S50: NO), the feedback controller 150 performs feedback control using the second gain pattern. However, when the rotational speed Vt reaches the target rotational speed Vb at a time tb (S50: YES), the polygon motor controlling mechanism 100 advances to S60.

In S60 the CPU 115 monitoring the rotational speed Vt issues a command to change the irradiation pattern of the laser beam (light pattern) to a pattern based on image data and to begin forming an image on the photosensitive drum 28. At the same time, the switch controller 151 transmits the switch command Sr to the gain pattern switcher 153. Upon receiving the switch command Sr, the gain pattern switcher 153 switches the gain pattern from the second gain pattern to the third gain pattern. Hence, in the illustrative aspects, the gain pattern is switched a second time when the rotational speed Vt reaches the target rotational speed Vb.

After switching to the third gain pattern, the feedback control process is basically performed using the smallest gain G3. However, the switch controller 151 simultaneously performs a process to determine fluctuations in the rotational speed Vt inputted from the signal processor 127. In other words, the switch controller 151 determines whether the deviation X falls within the first region S1.

If the deviation X goes outside of the first region S1, then the switch controller 151 outputs the switch command Se to the feedback processor 155. Upon receiving the switch command Se, the feedback processor 155 changes the gain to a larger gain G2 or gain G4 and performs the arithmetic processes based on this larger gain.

Hence, if the rotational speed Vt becomes sufficiently larger than the target rotational speed Vb to go out of the first region S1, a larger control amount Y can be set by changing the gains to the gain G2 or gain G4, which are larger than the current gain G3, so that the rotational speed Vt can be quickly returned to a value near the target rotational speed Vb.

In the illustrative aspects, the gain is changed from the gain G3 to the gain G2 when the deviation X enters the third region S3. The gain is changed from the gain G3 to the gain G4 which is larger than the gain G2, when the deviation X enters the second region S2. This is based on the response characteristics of the motor Mp.

Specifically, when in the faster region, the rotational speed Vt has a tendency to not change linearly in response to the magnitude of the control amount Y and therefore has worse response than in the slower region. This is primarily due to switching loss during phase switching and the like. However, in the illustrative aspects, when the rotational speed of the motor Mp goes beyond the first region S1 in the fast direction, it is possible to minimize response delay in the motor Mp by selecting the gain G4, which is larger than the gain G2 used when the rotational speed deviates in the slower direction.

As described above, the gain in the third gain pattern changes according to the level of the deviation X. As shown in FIG. 7, the motor Mp continues to accelerate after the time tb. At a time tc (point C), the deviation X has exceeded the first region S1 in the plus direction. Therefore, in the illustrative aspects the gain is switched from the gain G3 to the gain G4 at this point. After changing the gain in this way, the motor Mp begins to decelerate and gradually approaches the target rotational speed Vb. Subsequently, at a time td (point D) the deviation X again returns to the first region S1. Accordingly, the gain setting is switched from the gain G4 to the gain G3 at this time. Thereafter, the rotational speed Vt is stabilized within the first region S1 so that the motor Mp can be controlled through feedback using the gain G3.

According to the illustrative aspects described above, the gain is set to the lowest gain G3 within the first region S1 in which the deviation X to the target rotational speed Vb is small. This method suppresses overshoot and ringing around the target rotational speed Vb, thereby rapidly stabilizing the rotational speed Vt. Moreover, the gain G3 is applied directly after the rotational speed Vt of the motor Mp reaches the target rotational speed Vb (the time tb). Hence, although the deviation X is small just before the rotational speed Vt reaches the target rotational speed Vb, the second gain pattern is selected at this time to apply the gain G2, which is greater than the gain G3.

Accordingly, the control amount Y is determined based on the larger gain G2 without switching to the smaller gain G3 at least until the rotational speed Vt has reached the target rotational speed Vb, thereby shortening the time required for the rotational speed Vt to reach the target rotational speed Vb after startup. In this way, image formation can be started quickly, since the motor Mp quickly reaches the target rotational speed Vb.

Further, the first region S1 in which the gain G3 is applied is equally set on both sides (plus and minus sides) of the target rotational speed Vb. This setting can achieve better balance and more quickly stabilize the rotation of the motor Mp than when, for example, the first region S1 is not set uniformly or when the gain settings are different in the region near the target rotational speed Vb when the rotational speed of the motor Mp is above or below the target rotational speed Vb.

In the illustrative aspects, the BD sensor 125 along with the FG sensor 121 is provided, both of which sensors can detect the rotational speed of the motor Mp. However, the FG sensor 121 is generally susceptible to the demagnetization effects of the rotor and has a response delay in detection and, therefore, does not have a high detection precision. In contrast, the BD sensor 125 is an optical sensor having quick response and, hence, higher detection precision than the FG sensor 121.

Accordingly, in the illustrative aspects, the gain pattern and, consequently, the gain are switched according to the type of sensor being used (processes in S30 and S40). In this way, the small gain G1 is used when detecting the rotational speed Vt with a sensor not expected to have a high detection precision, that is, expected to have greater error in detection. In this way, even if there is a large detection error, the error is not greatly magnified, resulting in more accurate control for the rotational speed of the motor Mp.

In addition, control is performed near the target rotational speed Vb using the BD sensor having a higher detection precision. This configuration also contributes to improving the precision in controlling the rotational speed of the motor Mp.

Further, since the laser printer 1 of the illustrative aspects begins image formation after the rotational speed Vt of the motor Mp has reached the target rotational speed Vb, the laser printer 1 can improve image quality.

While the invention has been described in detail with reference to the above aspects thereof, it would be apparent to those skilled in the art that various changes and modifications may be made therein without departing from the spirit of the invention.

(1) In the above-described illustrative aspects, an example of the feedback controller 150 controlling the motor Mp is described. However, the same control process may be applied to the main motor, provided that the main motor is a DC motor, and may be applied to an electronic device other than the laser printer 1.

(2) While an FG sensor is used for detecting the rotational speed in a low-speed region in the illustrative aspects described above, it is also possible to detect the rotational speed in this region based on a positioning signal from a Hall element.

What is claimed is:

1. An electronic device comprising:
   a motor;
   a detector that detects a rotational speed of the motor; and
   a controller that selects a gain from a plurality of gains based on the rotational speed and that controls rotation of the motor through feedback control,
   wherein the controller uses a first gain from startup of the motor until the motor initially reaches a predetermined rotational speed after the startup; and
   wherein the controller switches to a second gain smaller than the first gain when the motor initially reaches the predetermined rotational speed after the startup, and uses the second gain in a predetermined range with respect to the rotational speed, the predetermined range being defined between a lower limit smaller than the predetermined rotational speed and a higher limit larger than the predetermined rotational speed.

2. The electronic device according to claim 1, wherein the predetermined range is set in such a manner that a difference between the predetermined rotational speed and the lower limit is equal to a difference between the higher limit and the predetermined rotational speed.

3. The electronic device according to claim 1, wherein, after the motor initially reaches the predetermined rotational speed after the startup, the controller selects a third gain larger than the second gain when the rotational speed goes beyond the predetermined range in a slower direction, and selects a fourth gain larger than the third gain when the rotational speed goes beyond the predetermined range in a faster direction.

4. An image forming apparatus comprising:
   a photosensitive member;
   a polygon motor;
   a polygon mirror configured to be rotatably driven by the polygon motor for scanning a laser beam over the photosensitive member;
   a detector that detects a rotational speed of the polygon motor; and
   a controller that selects a gain from a plurality of gains based on the rotational speed and that controls rotation of the polygon motor through feedback control,
   wherein the controller uses a first gain from startup of the polygon motor until the polygon motor initially reaches a first rotational speed after the startup;
   is wherein the controller switches to a second gain smaller than the first gain when the polygon motor initially reaches the first rotational speed after the startup, and uses the second gain in a predetermined range with respect to the rotational speed, the predetermined range being defined between a lower limit smaller than the first rotational speed and a higher limit larger than the first rotational speed; and
   wherein an image formation on the photosensitive member with the laser beam is started after the polygon motor initially reaches the first rotational speed after the startup.

5. The image forming apparatus according to claim 4, wherein the predetermined range is set in such a manner that a difference between the first rotational speed and the lower limit is equal to a difference between the higher limit and the first rotational speed.

6. The image forming apparatus according to claim 4, wherein, after the polygon motor initially reaches the predetermined rotational speed after the startup, the controller selects a third gain larger than the second gain when the rotational speed goes beyond the predetermined range in a slower direction, and selects a fourth gain larger than the third gain when the rotational speed goes beyond the predetermined range in a faster direction.

7. The image forming apparatus according to claim 4, wherein the detector comprises a sensor that receives a laser beam reflected off the polygon mirror and that outputs a signal based on an amount of received light.

8. The image forming apparatus according to claim 4, wherein the detector comprises:
   a first sensor that receives a laser beam reflected off the polygon mirror and that outputs a signal based on an amount of received light; and
   a second sensor that outputs a signal having a frequency corresponding to the rotational speed; and
   wherein the controller detects the rotational speed based on the signal outputted from the second sensor until the polygon motor initially reaches a second rotational speed after the startup, and detects the rotational speed based on the signal outputted from the first sensor after the polygon motor reaches the second rotational speed, the second rotational speed being less than the first rotational speed.

9. The image forming apparatus according to claim 8, wherein, when the controller switches from the second sensor to the first sensor, the controller selects a larger gain than a gain used when detecting the rotational speed based on the second sensor.

* * * * *